(12) United States Patent
Iversen et al.

(10) Patent No.: US 6,784,573 B1
(45) Date of Patent: Aug. 31, 2004

(54) CORROSION-RESISTANT LIQUID-COOLED ARMATURE BAR CLIP-TO-STRAND CONNECTION AND RELATED METHOD

(75) Inventors: Alan Michael Iversen, Clifton Park, NY (US); Robert Timothy Lembke, Amsterdam, NY (US); James Rollins Maughan, Schenectady, NY (US); Robert John Nygard, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/418,296

(22) Filed: Apr. 18, 2003

(51) Int. Cl.[7] ................................................. H02K 3/04
(52) U.S. Cl. ........................... 310/52; 310/54; 310/201; 310/260
(58) Field of Search ......................... 174/128.1; 310/54, 310/70, 52, 201, 260

(56) References Cited

U.S. PATENT DOCUMENTS

| | | |
|---|---|---|
| 2,473,887 A | 6/1949 | Jennings et al. |
| 3,510,700 A | 5/1970 | Grinchenko et al. |
| 3,551,995 A | 1/1971 | Marechal |
| 4,629,917 A * | 12/1986 | Brem ........................... 310/59 |
| 4,634,039 A | 1/1987 | Banerjee |
| 5,557,837 A | 9/1996 | Thiard-Laforet et al. |
| 5,581,869 A | 12/1996 | Travaly |
| 5,796,189 A | 8/1998 | Manning et al. |
| 5,875,539 A * | 3/1999 | Kilpatrick et al. ............ 29/596 |
| 6,577,038 B2 * | 6/2003 | Butman et al. ............. 310/201 |

* cited by examiner

*Primary Examiner*—Chau N. Nguyen
(74) *Attorney, Agent, or Firm*—Nixon & Vanderhye P.C.

(57) ABSTRACT

A brazed joint between an armature bar strand package and an end fitting is provided where a plurality of solid strands and a plurality of hollow strands are arranged in an array. The plurality of hollow strands have free ends that extend axially beyond corresponding free ends of the solid strands. A cavity in the end fitting is accessed by an opening, and the free ends of the plurality of hollow and the corresponding free ends of the solid strands extend through the opening into the cavity. A braze alloy joins the free ends of the plurality of hollow strands and the corresponding free ends of the plurality of solid strands to each other and to interior surfaces of the end fitting, wherein the braze alloy does not extend substantially beyond the free ends of the solid strands. A related method of forming the brazed joint is also disclosed.

6 Claims, 3 Drawing Sheets

CORROSION-RESISTANT LIQUID-COOLED ARMATURE BAR CLIP-TO-STRAND CONNECTION AND RELATED METHOD

BACKGROUND OF THE INVENTION

This invention relates generally to the manufacture of generators and, specifically, to improving the joint between a hydraulic header clip or fitting and a liquid cooled armature bar.

The armature windings of large steam turbine generators are generally water-cooled. The armature windings are composed of half coils or armature bars connected at each end through copper or stainless steel fittings and water-cooled connection rings to form continuous hydraulic circuits. The hydraulic winding circuits are connected to inlet and outlet water manifolds with plastic hoses to provide electrical isolation. The manifolds are connected to the stator water cooling system which cools, filters and deionizes the water and pumps the water back to the armature winding. The armature bars are each composed of rectangular copper (or other suitable metal or alloy) strands arranged in rectangular bundles or packages. The copper strands can be all hollow strands or a mixture of solid and hollow strands. The hollow strands provide a duct for conducting cooling water. The strands are joined to each other and to a waterbox end fitting or header clip at each end of an armature bar. The header clip functions to deliver water to and collect water from the hollow strands. The header clip is connected through copper or stainless steel fittings to a second armature bar to form a complete armature coil element of the winding. The joints between the strands and the header clip must retain hydraulic and electrical integrity for the 30-year plus expected lifetime of the winding. The filler metal or braze alloy that joins the strands and the header clip is constantly exposed to a deionized, oxygenated water environment and corrosion of the filler metal and adjoining strand surfaces can occur under certain conditions. The corrosion process can initiate if the joint surface contains surface crevices, pinholes, or porosity, and the critical water chemistry conditions that can support corrosion develop within these indications. The corrosion process can continue through the braze joint as long as critical crevice and water chemistry conditions exist. Underlying porosity within the braze joint can accelerate the corrosion rate. Eventually, the path of corrosion can result in water leakage through the joint compromising the hydraulic integrity of the header clip-to-strand joint.

In a previous approach to solving the problem, all of the strands were cut to the same length and the filler metal or braze alloy was pre-placed flush to the ends of the strands. A braze alloy anti-wetting agent was used on the ends of the strands to prevent plugging of the hollow strands and an inert purge gas was used during the brazing cycle. (See U.S. Pat. No. 5,796,189). Use of the anti-wetting agent, although effective for preventing hollow strand plugging, resulted in a high probability of causing potential corrosion-initiation sites on the surface of the braze joint, discontinuities in surface wetting, and crevices between braze alloy fillets and hollow strands. It was also observed that the anti-wetting agent could be improperly applied and, through capillary action, flow between strands, resulting in strand faying surface contamination and a poor effective braze joint length. The inert purge gas limited oxidation during the brazing cycle but provided no de-oxidizing benefits.

BRIEF DESCRIPTION OF THE INVENTION

This invention provides for a brazed connection between a liquid-cooled armature bar strand package and a hydraulic header clip having significantly reduced potential corrosion-initiation sites on the joint surface and longer effective braze joint lengths. The invention also eliminates the need for an anti-wetting agent and employs a de-oxidizing purge gas which improves braze alloy wetting and flow.

In the exemplary embodiment, the resulting clip-to-strand braze joint contains extended hollow strands which ensures that the hollow strand openings will not become plugged during brazing. This arrangement also eliminates the need to use a potentially contaminating filler metal anti-wetting agent on the ends of the hollow strands, and provides smooth, continuous fillets of braze alloy around all strands and between the strand package and the header clip. It also reduces voids on the braze joint surface and the invention also results in lower porosity within the joint due to the de-oxidizing benefits of the purge gas.

In practicing the invention, a special tool may be employed to shorten the solid strands at each end of the strand package, but other suitable techniques may also be employed. In addition, a filler metal or braze alloy is used that is designed to fill both small and large gaps and wetted surfaces, and is pre-placed flush with the ends of the shortened solid strands. Finally, a de-oxidizing forming or purge gas is used to purge the armature bar during the brazing cycle. A cover gas micro-environment is formed within the header clip cavity to maximize the deoxidation of faying surfaces prior to the braze alloy melting and flowing. The temperature of the strand package and header clip are increased using a pre-programed time-temperature profile until the braze alloy melts, flows, and fills the braze joint in a single-step, automated brazing cycle. The de-oxidizing forming gas purge is continued until the joint cools to a non-oxidizing level.

In its broader aspects, therefore, the invention relates to a brazed joint between an armature bar strand package and an end fitting comprising a plurality of solid strands and a plurality of hollow strands arranged in an array and forming the strand package, the plurality of hollow strands having free ends that extend axially beyond corresponding free ends of the solid strands; a cavity in the end fitting accessed by an opening, the free ends of the plurality of hollow strands and the corresponding free ends of the solid strands extending through the opening and received in the cavity; and a braze alloy joining the free ends of the plurality of solid strands and the corresponding free ends of the plurality of hollow strands to each other and to interior surfaces of the end fitting, wherein the braze alloy, prior to melting, does not extend axially beyond the free ends of the solid strands.

In another aspect, the invention relates to a brazed joint between an armature bar and an end fitting comprising an array of solid and hollow strands arranged in an array, the hollow strands having free ends that extend axially beyond corresponding free hollow ends of the solid strands, wherein the solid strands and the hollow strands are present in a ratio of from 1 to 1 to 6 to 1; a cavity in the end fitting, accessed by an opening, the array received in the opening; and a braze alloy joining the solid and hollow strands to each other and to internal surfaces of the end fitting, the braze alloy not extending substantially beyond the free ends of the solid strands.

In still another aspect, the invention relates to a method of forming a brazed joint between an armature bar and an end fitting comprising: providing an armature bar having a strand package comprising a plurality of hollow strands and a plurality of solid strands such that free ends of the hollow strands extend axially beyond free ends of the solid strands;

pre-placing a braze alloy on the free ends of the hollow strands and the solid strands such that the braze alloy does not extend axially beyond the free ends of the solid strands; inserting the strand package and braze alloy through an opening and into a cavity in the end fitting; purging the cavity with a de-oxidizing purge gas; and heating the armature bar strand package and the end fitting to a temperature sufficient to melt and flow the braze alloy.

The invention will now be described in connection with the drawings identified below.

DETAILED DESCRIPTION OF THE INVENTION

Figure 1:
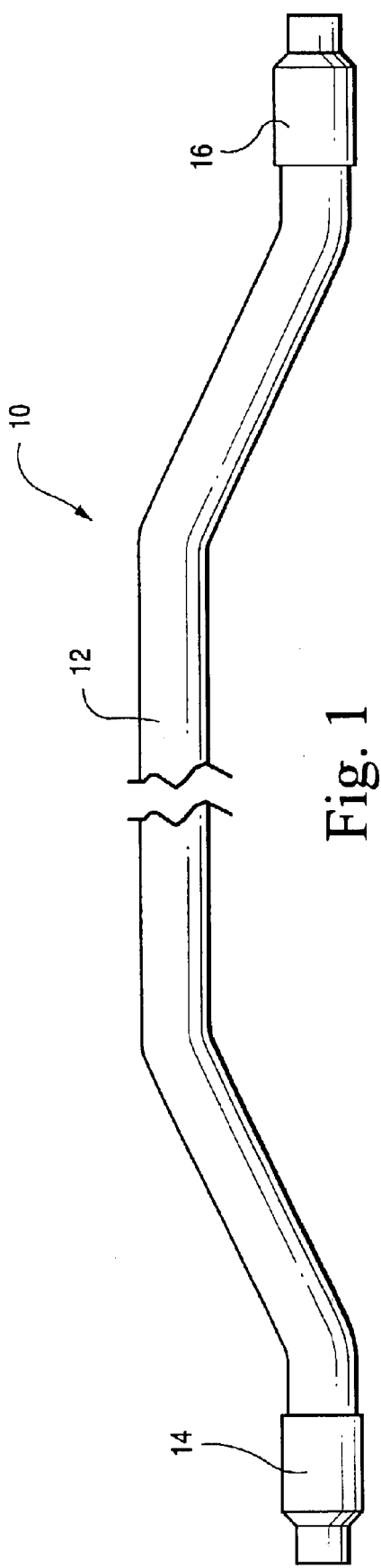
FIG. 1 is a side elevation of an armature bar and header clip assembly.

Referring now to FIG. 1, a liquid-cooled stator winding used in a typical liquid-cooled generator includes a plurality of armature bars 10 (one shown, also referred to as an armature bar strand package), the center portion 12 of which is adapted to pass through radially extending slots in a stator core (not shown), and terminating at opposite ends in hydraulic end fittings or header clips 14 and 16, respectively, typically formed of an electrically conductive material such as copper. Inlet hoses (not shown) connect the header clips 14, 16 to an inlet coolant header (also not shown).

The armature bar strand package 10 is composed of many small rectangular solid and hollow copper strands 18, 20, respectively (FIGS. 2 and 3), that are brazed to the interior of the header clips 14, 16 as further described below. It will be appreciated that the strands 18, 20 may also be constructed of metals other than copper, such as copper-nickel alloys or stainless steel.

Figure 3:
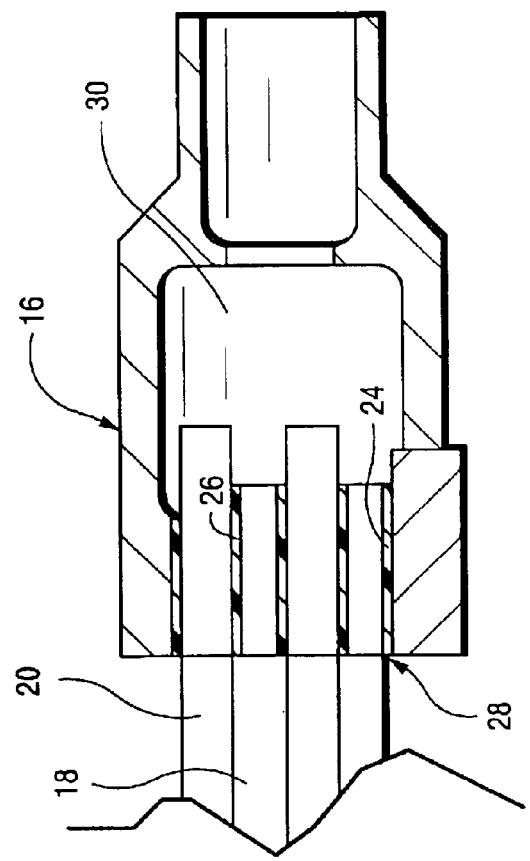
FIG. 3 is a side section of the connection shown in FIG. 2.
Figure 2:
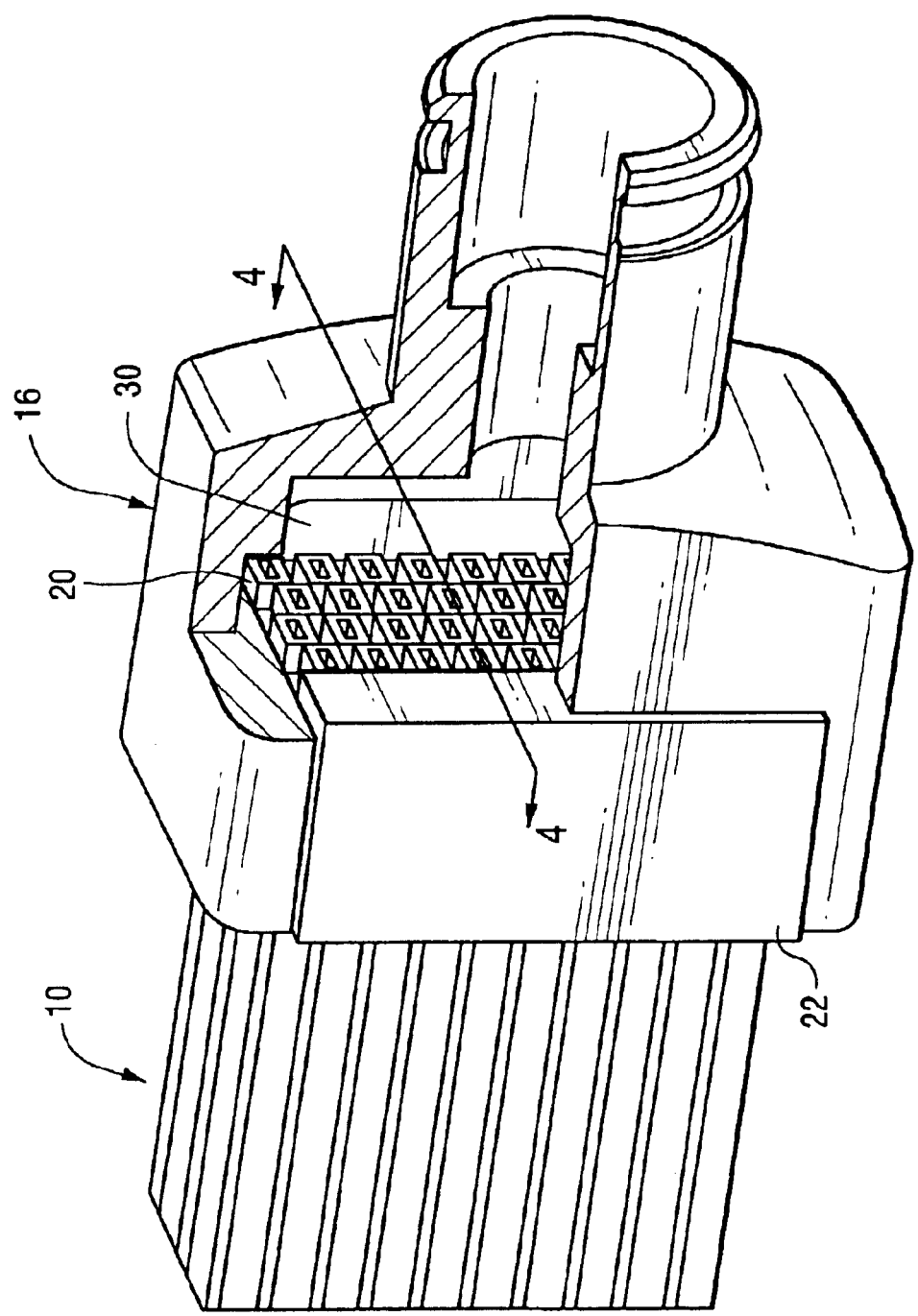
FIG. 2 is a perspective view, partly broken away, of a header clip-to-strand connection in accordance with an exemplary embodiment of the invention.
Figure 4:
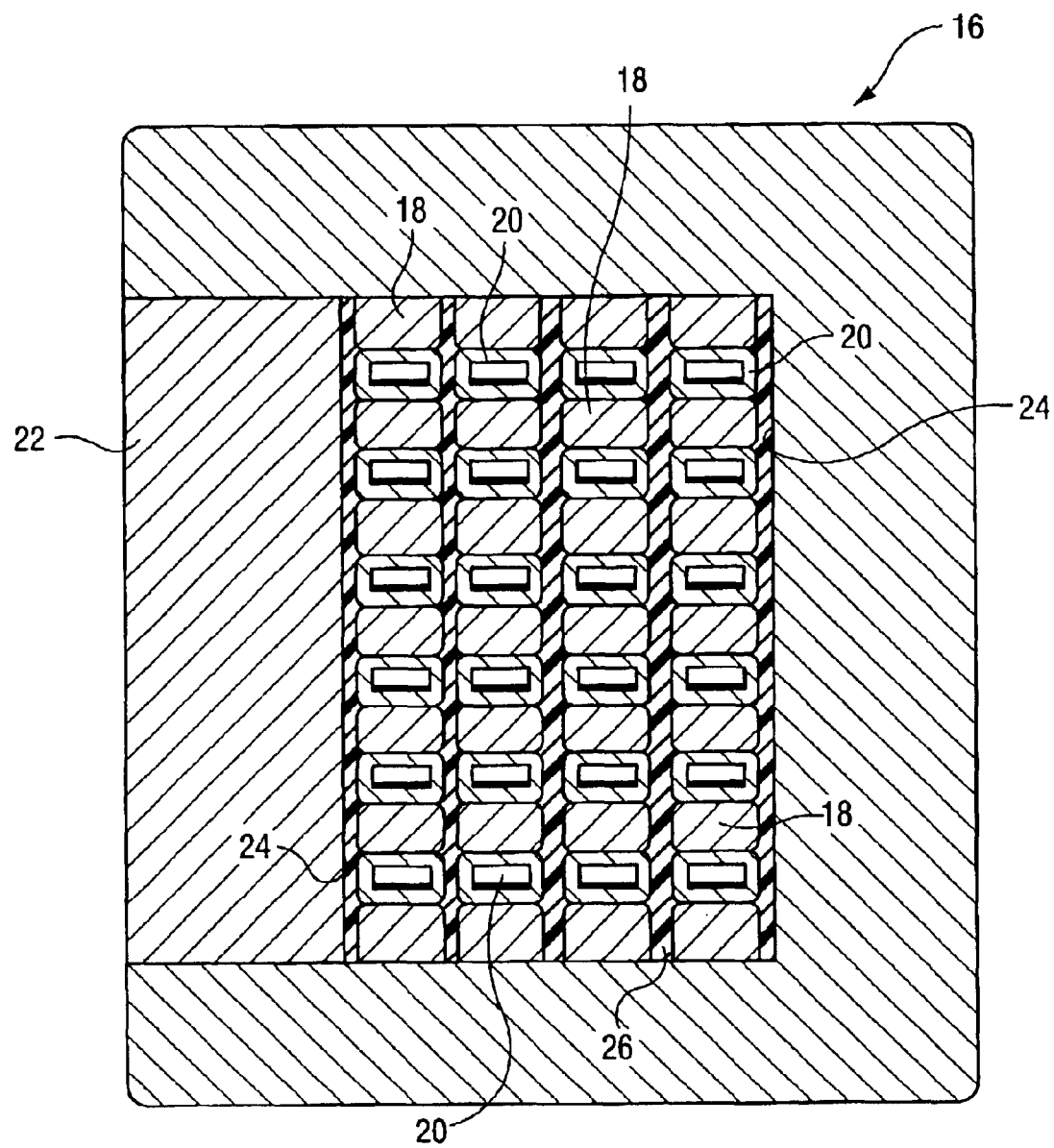
FIG. 4 is a section taken along the line 4—4 of FIG. 2.

As best seen in FIGS. 2 and 3, the solid and hollow copper strands 18, 20 are disposed in parallel, side-by-side and superposed relation one to the other, in a generally rectangular array. The array (see FIG. 4) may be compressed within the hydraulic end fitting or header clip 16 by means of a side plug 22 fitted within a similarly shaped "window" cut-out of the header clip. The rows of strands 18, 20 within the stator bar are brazed to one another as well as to the interior surfaces 24 of the end fitting using a filler metal or braze alloy 26. The braze alloy 26 may comprise a self-fluxing copper phosphorous alloy similar to AWS 15.8 BcuP-1 or other suitable composition.

The particular configuration of solid strands 18 and hollow strands 20 within the package may vary. For example, there may be a 1 to 1 ratio of solid strands to hollow strands, up to a ratio of, for example, 6 to 1 or more, depending on the capability of the bar design to remove heat during generator operation, and the arrangement of solid and hollow strands within the array may vary as well.

As best seen in FIGS. 2 and 3, the free ends of the hollow strands 20 extend axially beyond the corresponding free ends of the solid strands 18. The differential lengths of the solid and hollow strands may be achieved by any suitable means including the use of a specialized tool to shorten the solid strands. The filler metal or braze alloy 26 is pre-placed within the header clip 16 so as to surround the strands, but not extend axially beyond the solid strands. When heated to its melting temperature, the braze alloy flows and fills in the spaces between the solid and hollow strands 18, 20 and between the strands and the interior surfaces 24 of the header clip, including at the opening 28 of the header clip into which the strands are inserted. At its melting temperature, the alloy remains sufficiently viscous that it does not flow substantially beyond the free ends of the solid strands 18. In other words, the extended length of the hollow strands 20 provides a safety margin in that the excess alloy material will not flow out as far as the ends of the hollow strands, precluding the possibility of plugging the hollow strands. A de-oxidizing purge gas is used to purge the header clip cavity 30 during the brazing cycle. More specifically, a cover gas micro-environment is formed within the header clip cavity 30 to maximize the deoxidation of faying surfaces prior to the braze alloy 26 melting and flowing. The temperature of the strand package and header clip is then increased, using a preprogrammed time-temperature profile until the braze alloy melts, flows and fills the braze joint in a single step, automated brazing cycle. The forming gas purge is continued until the header clip and strand package cools to a non-oxidizing temperature.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A brazed joint between an armature bar strand package and an end fitting comprising:

a plurality of solid strands and a plurality of hollow strands arranged in an array and forming the strand package, said plurality of hollow strands adapted to circulate cooling water and having parallel free ends that extend axially beyond corresponding free ends of said solid strands;

a cavity in the end fitting accessed by an opening, said parallel free ends of said plurality of hollow strands and said corresponding parallel free ends of said solid strands extending through said opening and terminating in said cavity such that said free ends of both said solid and hollow strands are exposed to the cooling water; and a braze alloy joining said free ends of said plurality of hollow strands and said corresponding free ends of said plurality of solid strands to each other and to interior surfaces of said end fitting, wherein said braze alloy, prior to melting, lies flush with said free ends of said solid strands and after melting, said braze alloy does not extend axially to said free ends of said hollow strands.

2. The brazed joint of claim 1 wherein said braze alloy lies flush with said free ends of said solid strands.

3. The brazed joint of claim 1 wherein said array comprises said solid strands and said hollow strands in a ratio of from 1 to 1 to 6 to 1.

4. The brazed joint of claim 1 wherein said array comprises said solid strands and said hollow strands in a ratio of 1 to 1.

5. The brazed joint of claim 1 wherein said end fitting is formed with an opening into a cavity, and wherein a side plug is adapted for compressing said solid and hollow strands within the end fitting.

6. A brazed joint between an armature bar and an end fitting comprising:

an array of solid and hollow strands arranged in an array, said hollow strands adapted to circulate cooling water and having parallel free ends that extend axially beyond corresponding free ends of said solid strands, wherein said solid strands and said hollow strands are present in a ratio of from 1 to 1 to 6 to 1;

a cavity in the end fitting, accessed by an opening, said array extending through said opening with said free ends of said solid and hollow strands terminating within said cavity such that said free ends of both said solid and hollow strands are exposed to the cooling water; and a braze alloy joining said solid and hollow strands to each other and to internal surfaces of said end fitting, said braze alloy not extending substantially beyond said free ends of said solid strands.

* * * * *